Figure 1:
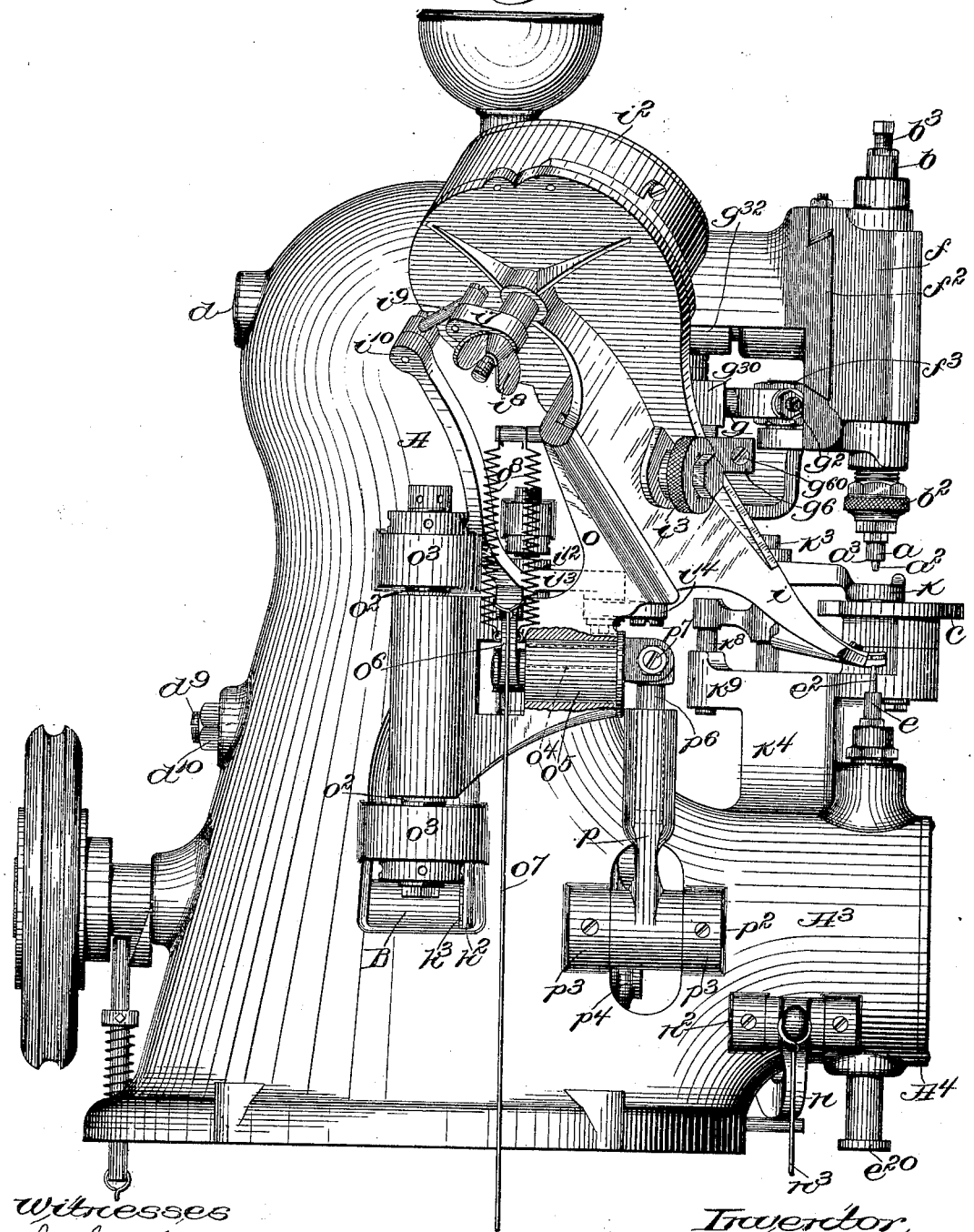

No. 686,927. Patented Nov. 19, 1901.
P. R. GLASS.
EYELETING MACHINE.
(Application filed Jan. 23, 1899.)

(No Model.) 5 Sheets—Sheet 1.

Witnesses
Jas. J. Maloney
Nancy P. Ford

Inventor,
Perley R. Glass.
by J. P. and H. J. Livermore
Att'ys

No. 686,927. Patented Nov. 19, 1901.
P. R. GLASS.
EYELETING MACHINE.
(Application filed Jan. 23, 1899.)

(No Model.) 5 Sheets—Sheet 4.

Witnesses
Jas. J. Maloney
Nancy P. Ford

Inventor,
Perley R. Glass,
by J. P. and J. Livermore
Att'ys.

No. 686,927.
Patented Nov. 19, 1901.
P. R. GLASS.
EYELETING MACHINE.
(Application filed Jan. 23, 1899.)
(No Model.)
5 Sheets—Sheet 5.
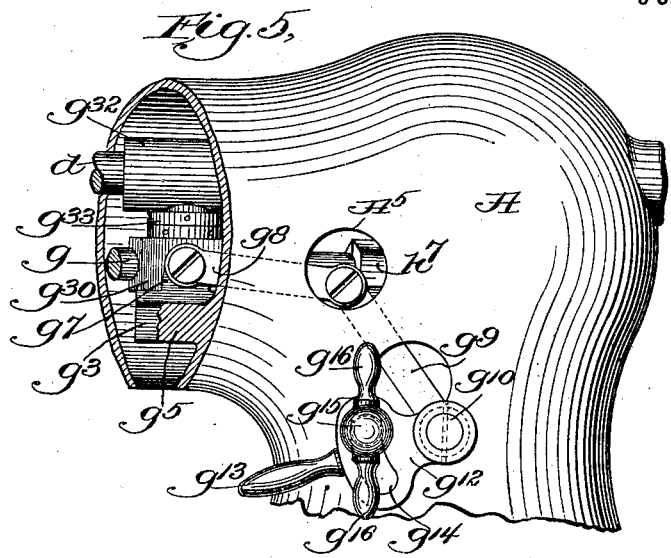
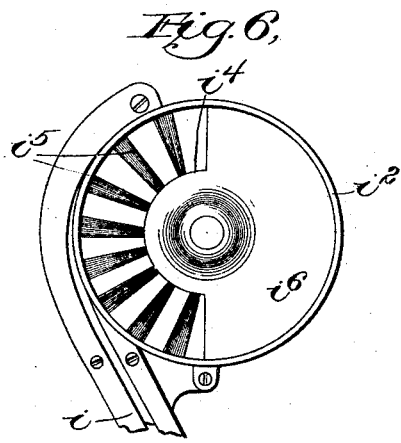
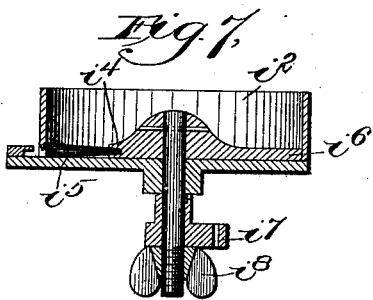

UNITED STATES PATENT OFFICE.

PERLEY R. GLASS, OF QUINCY, MASSACHUSETTS, ASSIGNOR, BY MESNE ASSIGNMENTS, TO THE PEERLESS MACHINERY COMPANY, A CORPORATION OF WEST VIRGINIA.

EYELETING-MACHINE.

SPECIFICATION forming part of Letters Patent No. 686,927, dated November 19, 1901.

Application filed January 23, 1899. Serial No. 703,084. (No model.)

*To all whom it may concern:*

Be it known that I, PERLEY R. GLASS, of Quincy, county of Norfolk, and State of Massachusetts, have invented an Improvement in Eyeleting-Machines, of which the following description, in connection with the accompanying drawings, is a specification, like letters on the drawings representing like parts.

The present invention relates to a machine for setting eyelets, rivets, and the like, and is embodied in a machine in which a combined punch and setting-tool is employed to punch the stock and also to coöperate with another setting-tool, whereby the eyelet or rivet is clenched in the hole previously punched. The punch portion of the tool aforesaid is tubular and provided with a cutting edge adapted to enter the stock and punch a hole therein and an annular shoulder to engage and upset or clench the edge of an eyelet or similar device which is presented thereto by the other setting-tool, which is arranged to reciprocate toward and from the combined punch and setting-tool above described. The machine is also provided with means for feeding the material after each setting operation, and the said combined punch and setting-tool may be arranged to have both a longitudinal and a lateral movement, the longitudinal movement taking place first to produce the punching operation and the lateral movement following to feed the material. The material to be operated upon is supported upon a suitable table, and the punch coöperates with an anvil which constitutes the other member of the punching mechanism, while the combined punch and setting device, which will be hereinafter referred to for convenience as the "punch," is so arranged that in its initial operation it is moved toward the work-support and then slightly away from the same, so as to be out of contact with the anvil and yet not disengaged from the material. The punch and anvil may thereafter be separated in order to allow the operation of the setting device, which coöperates with the punch to complete the setting operation. The punch after having completed its punching operation and being freed from the anvil and in position to coöperate with the setting device, which will be hereinafter referred to for convenience as the "lower set," remains stationary, while said lower set moves toward the said punch, taking an eyelet from an eyelet-feeding device and inserting the same into the opening made by the punch, the eyelet being set or clenched between the annular shoulder and the lower set. The punch is shown as guided in its longitudinal movement by a slide member, and the said longitudinal movement may be provided for by means of an eccentric which is so arranged that the slide member is free to move with relation thereto to produce the lateral movement of the punch, but is prevented from movement with relation thereto in the direction to produce the longitudinal movement of the punch, so that the said eccentric in turning will cause a reciprocation of the punch without interfering with the lateral movement thereof.

The eccentric above described is shown as mounted on a shaft provided with a gear arranged to be operated by a segment at the end of a lever, which in turn is oscillated by means of a cam on the main shaft, arranged to produce a positive movement of said lever in each direction. The sliding guide is shown as connected, by means of a universal joint, with a lever similarly operated by a cam on the main shaft, the said slide being provided in accordance with the invention with means for varying the extent of movement thereof, this being accomplished by connecting the said slide with its actuating-lever by means of an intermediate lever having a movable pivotal support, whereby the same extent of movement imparted to one end of the lever may be caused to produce a movement of variable extent at the other.

The eyelet-feeding device comprises a hopper having a raceway of the usual construction adapted to present the eyelets one at a time to a yielding finger carried by the lower set, the said eyelet-feeding device being arranged to oscillate, so that the end of the chute moves into and out of the path of the lower set and is operated by means of an arm adapted to engage a cam on the main shaft of the machine. The feed-hopper for the eyelets is also provided with an agitating device of novel construction, which forms a feature of the invention and will be more fully described hereinafter.

Figure 2:
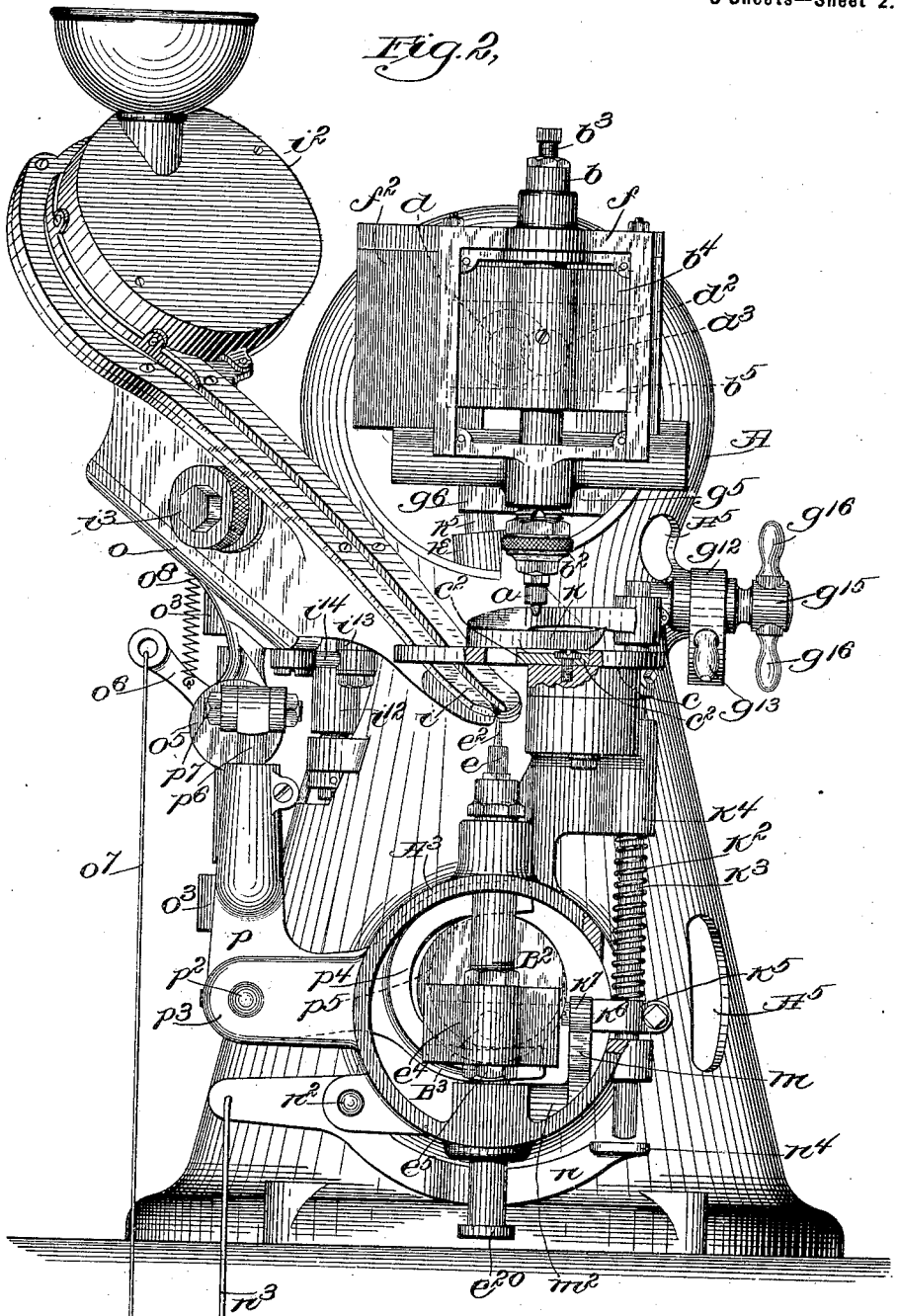
Figure 3:
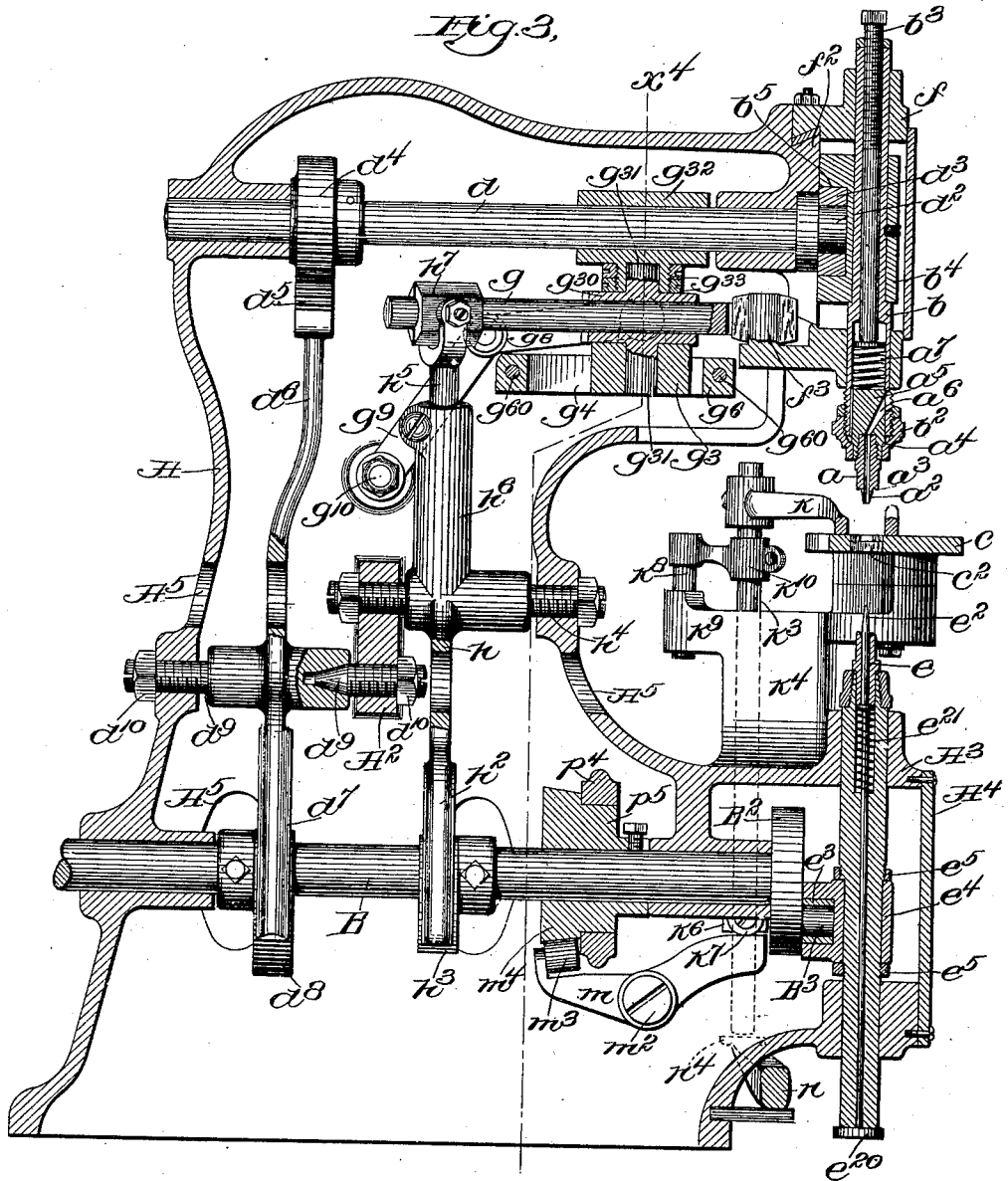
Figure 4:
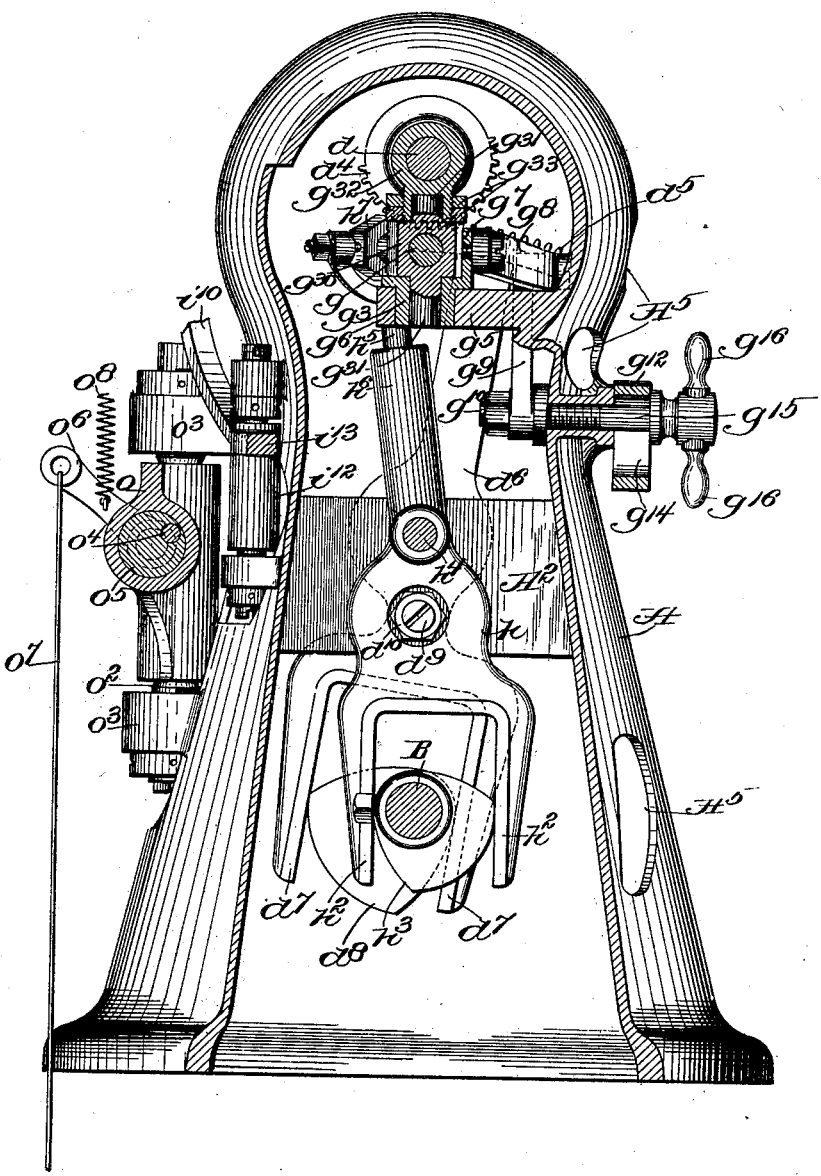

Figure 1 is a side elevation of a machine embodying the invention; Fig. 2, a front elevation, partly in section, of the same; Fig. 3, a vertical section in the plane of the main shaft of the machine; Fig. 4, a section mainly on line $x^4$ of Fig. 3; Fig. 5, a detail, partly in elevation and partly in section, showing the means for varying the feed movement of the material-feeding device; Figs. 6 and 7, details showing, respectively, in plan and section the eyelet-feed hopper and agitating device.

The punch $a$, which is adapted to punch the material and also to coöperate with the lower set in the setting operation, is shown as provided with a tubular projection $a^2$ and an annular shoulder $a^3$, which is arranged to engage and upset or clench the eyelet. Referring to Fig. 3, the said punch is shown as adjustably secured to the end of a vertically-movable plunger $b$ and is held in its adjusted position by means of a nut or cap $b^2$, screw-threaded on the outside of the said plunger, the said cap being adapted to engage a shoulder $a^4$, formed on a block $a^5$, which constitutes a holder for the punch and is provided with a tubular opening or bore $a^6$ in line with the tubular opening in the punch, so that the waste pieces of material are forced out through the said opening in the punching operation. The said block $a^5$ is normally held in contact with the adjustable nut $b^2$ by means of a spring $a^7$, interposed between the said block $a^5$ and an adjustable rod $b^3$, which regulates the tension of the spring, so that the said spring may be properly adjusted to insure a perfect punching operation without liability of injury to the punch by its contact with the anvil, as would be the case if the punch were rigidly supported. To produce the punching operation, the punch, carried by its plunger $b$, is arranged to be reciprocated toward and from a suitable feed-table $c$, which is provided with an anvil $c^2$, and for this purpose said plunger is shown as coöperating with an eccentric $d^2$ on a shaft $d$, said eccentric fitting into a block $d^3$, which practically constitutes an eccentric-strap.

It is desirable after each eyelet is set to automatically feed the material, and while any suitable feeding device may be employed the punch is herein shown as laterally movable and adapted to be laterally moved while it is still in engagement with the material. To this end the eccentric $d^2$ is so arranged with relation to the plunger $b$ that a lateral movement of said plunger with relation to said eccentric can take place, while there can be no longitudinal movement of said plunger with relation to said eccentric, it being obvious, therefore, that in the rotation or oscillation of the eccentric $d^2$ a vertical reciprocating movement of the plunger $b$ will be produced, which is totally independent of the position to which said plunger may be moved laterally.

As herein shown, the plunger $b$ is secured in a support $b^4$, provided with a channel $b^5$, into which channel fits the eccentric-block $d^3$, which is thus in engagement with the upper and lower walls of said channel, but free to move lengthwise therein, the said block $d^3$ being employed merely for the purpose of affording a better bearing, since it is obvious that the eccentric might coöperate directly with the walls of the channel aforesaid.

The shaft $d$ is herein shown as arranged to be oscillated and for this purpose is provided with a gear $d^4$, intermeshing with a segment $d^5$ at the end of a lever-arm $d^6$, having forked extremities $d^7$ arranged to engage at each side the periphery of a cam $d^8$, mounted on the main shaft B of the machine. The said lever $d^6$ is shown as having an adjustable cone-bearing, being supported on the cones $d^9$, one of which cones is screw-threaded in a support $A^2$, extending from one wall to the other of the frame A, and the other in the outer wall or shell of the frame itself. The said cones are each provided with lock-nuts $d^{10}$, whereby they are maintained in proper adjustment. At each rotation of the main shaft therefore the shaft $d$ is oscillated, causing the eccentric $d^2$ to produce a reciprocating movement of the punch-plunger $b$, the cam $d^8$ being properly shaped to cause a dwell in such movement at the proper time.

In the operation of the machine the punch $a$ moves toward the anvil or coöperating punching device $c^2$, entering the material supported on said anvil and punching a hole therein, and in order that said punch may be free to coöperate with the lower set $e$, which is of the usual construction to set and clench the eyelet, it is necessary that the position of one of the coöperating punching devices should be shifted in order that the punch and set may meet. As herein shown, this is accomplished by laterally moving the punch, and in order to afford such movement the plunger $b$ is guided and supported by a laterally-movable guide-frame $f$, supported and adapted to travel upon a dovetail projection $f^2$, formed on the machine-frame, so that as the said frame is moved laterally it will carry the punch with it, the block $b^4$ sliding with relation to the eccentric, so that the lateral movement of the plunger is entirely independent of the longitudinal movement thereof. To produce the lateral movement of the frame and the punch, the said frame is shown as connected, by means of an intermediate lever $g$, with an operating-lever $h$, provided with forked extremities $h^2$, coöperating with a cam $h^3$ on the main shaft B, the said cam and lever being arranged substantially like the cam $d^8$ and lever $d^6$, hereinbefore described. The said lever $h$ is mounted on cone-bearings $h^4$, similar to those employed with the lever $d^6$, said bearings therefore needing no further detailed description.

Since the lever $h$ is arranged to swing or oscillate, while the sliding frame $f$ has a rectilinear movement, it is necessary to compensate for the difference in movement, and to this end the connecting-lever $g$ is shown as having a pivotal bearing at $g^2$ upon a pin or projection $f^3$ on the frame $f$, the said connecting-lever $g$ being in turn pivotally supported in the block $g^{30}$, which is capable of being moved longitudinally along said lever for a purpose to be hereinafter described. The said lever $g$ is connected with the lever $h$ through the agency of an intermediate member $h^5$, shown as a forked rod projecting into a socket $h^6$ in the lever $h$, in which socket it is free to move longitudinally to compensate for the difference in direction of movement between the said lever $h$ and the lever $g$. The said member $h^5$ is provided with a sleeve $h^7$, fitting the lever $g$, which is free to move longitudinally in the said sleeve, the whole connecting mechanism thus constituting practically a universal joint. At each rotation of the main shaft B therefore the frame $f$, carrying the plunger $b$, is caused to reciprocate laterally, the parts being so timed that the operative movement thereof takes place after the stock has been punched and while the punch is still in the material, so that the material is fed along by the said punch, which is also then free to coöperate with the setting device and dwells during the setting operation, after which it is moved longitudinally away from the material and laterally back to its initial position by the instrumentalities already described. The eccentric $d^2$, which produces the longitudinal movement of the punch, is so arranged that in the oscillation of the shaft $d$ it moves a trifle beyond the position which produces the extreme forward or downward position of the punch, so that the stock is punched and the punch slightly lifted prior to the lateral movement produced by the cam $h^3$, as hereinbefore described. The punch therefore is lifted enough to be out of contact with the anvil, although it still remains in engagement with the material, since the dwell in the movement of the eccentric takes place at this time. This dwell continues throughout the lateral movement of the punch, which carries the said punch to a position directly over the lower setting device $e$, which is arranged to pick up an eyelet from the eyelet-feed chute $i$, substantially as in machines heretofore constructed. As the punch moves, carrying the material with it, the lower set rises and forces the mouth of the eyelet into the hole made by the punch, the said eyelet surrounding the tubular end of the punch until the edge of the eyelet is engaged and turned over by the shoulder $a^3$. As soon as this is accomplished the arm $d^6$ swings in the opposite direction, lifting the punch, and the return lateral movement of said punch then takes place, so that it is left in position for another punching operation, which takes place almost immediately, since there is no need of any dwell at this period in the operation.

The lower set $e$ is shown as having a bearing in a forward projection $A^3$ of the frame, the said projection being cylindrical, and preferably closed by the cover $A^4$. To produce the reciprocating movement of the lower set, the shaft B is shown as provided with a disk $B^2$, having a wrist-pin $B^3$, fitting a sliding block $e^3$, arranged to travel in a channel formed in a collar $e^4$, which is vertically adjustable along the body of the plunger, which carries the lower set $e$, so as to regulate the throw thereof. The said collar is shown as held in its adjusted position by means of nuts $e^5$. The spring-finger $e^2$, as has already been stated, projects upward from the surface of the lower set in order to pick up an eyelet from the feed-chute, it being necessary that the said finger should be withdrawn during the setting operation. In order, therefore, to withdraw the said finger without permitting the same to engage the punch, the said finger is formed on a rod which projects downward through the body of the reciprocating plunger, which carries the lower set, the said rod being provided with a head $e^{20}$, which projects beyond the surface of the plunger, so as to be engaged by the frame of the machine as the said plunger moves upward. The finger $e^2$ is held in its normal position, projecting beyond the clenching-surface by means of a spring $e^{21}$, so that as the plunger moves upward the finger will engage and pick up an eyelet, it being obvious, however, that during the upward movement of the plunger the finger will be withdrawn and will not engage the cutting edge of the punch, as would be the case if the finger were depressed by engagement with the punch.

In order to hold the material firmly in position while it is being operated upon, the machine is provided with a gripper $k$, (see Figs. 1, 2, and 3,) arranged to be held against the material upon the table $c$, as by a spring $k^2$. To permit the feed movement of the material, the said gripper is arranged to be lifted during the said feed movement, this being accomplished by means of a lever $m$, pivoted at $m^2$ and adapted to be rocked on its pivot by means of a cam $m^4$, mounted on the main shaft B and coöperating with a cam-roll $m^3$, supported on said lever. The gripper $k$ is shown as secured to a vertically-movable rod $k^3$, mounted in bearing-lugs $k^4$ and provided with a collar $k^5$, between which and one of said lugs is interposed the spring $k^2$. The said collar is shown as provided with a projection $k^6$, which is adapted to be engaged by the lever $m$, the said projection being preferably provided with a roll $k^7$, against which the said lever impinges. Each movement of the lever therefore in response to the rotation of the cam $m^4$ lifts the rod $k^3$ and separates the gripper member $k$ from the table $c$, so that the material is free to move along the said table with the lateral movement of the punch. To prevent the rod $k^3$ from turning in its bearings and to thereby keep in position the gripper $k$, which projects laterally from said rod, the said rod is shown as provided with a pin $k^8$, which enters a projection $k^9$ from a portion of the frame, the said pin being shown as formed on a projection connected with the rod $k^3$, as by a split collar $k^{10}$. As the said gripper member is normally in contact with the table $c$ when the punch is in its initial position ready to operate, it is necessary to lift the said gripper in order to insert the material which is to be operated upon prior to the starting of the machine. To this end the rod $k^3$ is also arranged to be operated upon by a lever $n$, pivoted at $n^2$ and arranged to be connected, as by a wire $n^3$, to a suitable treadle, the said lever having a footpiece $n^4$ to engage the lower end of the rod $k^3$, as shown in Fig. 2, so that by pressing on the treadle the gripper can be lifted to place the material on the table $c$ before starting the machine.

The eyelets are presented to the lower set, as has already been explained, from an eyelet-chute $i$, which receives eyelets from the hopper $i^2$, the said chute and hopper being detachably secured, as by a thumb-screw $i^3$, to an oscillating frame $o$, whereby the end of the said feed-chute is moved into and out of the path of the lower set $e$, so that the latter can properly pick up the eyelets one at a time. The said frame-piece, or "oscillating chute-support," as it may be called, is mounted on adjustable cones $o^2$, supported in lugs $o^3$, formed in the frame of the machine, (see Figs. 1, 2, and 4,) said cones, which are screw-threaded, as shown, and provided with lock-nuts, affording means for a vertical adjustment of the chute-support and chute. The said chute-support is arranged to be oscillated by a lever $p$, bearing on the rod $p^2$, supported by lugs $p^3$, the said lever being shown as an elbow-lever provided with a forked end $p^4$ to engage opposite sides of the cam $p^5$ on the main shaft B. The said lever $p$ and the chute-carrier $o$ oscillate on different axes, and it is therefore necessary to afford a compensating connection between them, this being accomplished by providing the lever $p$ with a vertically-movable rod $p^6$, pivotally connected at $p^7$ with a similar rod $o^4$, extending into a socket or bore formed in a block $o^5$, arranged to travel with the chute-carrier $o$, and mounted in a radial projection or arm connected with said carrier.

It is desirable in some cases to prevent the operation of the eyelet-feed chute when it is desired to punch the material without setting an eyelet therein. This is accomplished, as herein shown, by affording means for moving the chute-carrier $o$ with relation to the lever $p$, so that the end of the eyelet-chute is moved to such a position that in the operation of said lever it will not come into the path of the said lower set. As herein shown, the block $o^5$ is cylindrical and free to rotate in a socket formed in the chute-carrier $o$, and the rod $o^4$ projects into said block parallel to but at one side of the axis thereof, so that by rotating the said block the chute-carrier and chute will be moved independently of the movement of said lever. In order to rotate the block $o^5$ for the purpose described, the said block has connected therewith a radial arm $o^6$, connected by a rod $o^7$ with a suitable actuating device, such as a treadle, (not herein shown,) the arm, however, being held in its normal position by means of springs $o^8$, so that the eyelets will be properly fed except when the treadle is operated.

It is necessary in order to keep the eyelet-chute properly charged with eyelets to provide the hopper with a suitable agitating device, so that the eyelets will be continually stirred up to cause them to take the proper position to pass out through the openings in the eyelet-hopper, it being usual to provide the hopper with a number of bristles extending radially toward the said openings. The said bristles in turn are mounted on a hub which is arranged to be rotated or oscillated so as to keep the bristles traveling back and forth to prevent the eyelets from packing in a mass. It has been found, however, that with a heavy mass of eyelets in the hopper the bristles soon wear out and have to be renewed in order to operate efficiently. To obviate this difficulty, the hub $i^4$, which carries the bristles $i^5$, is provided in accordance with this invention with a plate or extension $i^6$, covering a portion of the bottom of the hopper, so that the edge of said plate cuts under the mass of eyelets, keeping the said mass from becoming packed down solid at the bottom, and thus greatly relieving the work of the bristles. As shown in the drawings, the floor or bottom of the hopper is inclined and the eyelet-openings are arranged along the side of the hopper, so that the greater mass of eyelets will tend to collect along the wall of the hopper below the said openings. As shown in Fig. 6, therefore, the plate $i^6$ is so arranged that the edge thereof will travel along under the mass of eyelets toward the feed-openings, but not past the same. The edge of the said plate $i^6$, therefore, will tend to push the eyelets upward from the main mass, thus doing the bulk of the work, while the bristles which actually travel past the openings help to distribute the eyelets thus pushed forward by the plate aforesaid. This largely relieves the strain on the bristles, so that while they work effectually they will last much longer. To produce the movement of the agitating devices within the hopper, the hub $i^4$ is provided with a crank $i^7$ outside of the hopper, the said crank being shown as connected with the hub by means of a thumb-screw $i^8$. The said crank in turn is connected by a link $i^9$ with a lever $i^{10}$, connected with an oscillating bearing member $i^{12}$, (shown as mounted on cone-bearings,) the said member having a short projecting arm $i^{13}$, which is the opposite direction, a guide-frame for said punch laterally movable with relation to said eccentric, and means for laterally reciprocating said guide-frame.

2. In an eyeleting-machine, a combined punch and setting device, an eccentric coöperating with said punch to produce a longitudinal movement thereof, a shaft carrying said eccentric, a lever provided with a segmental gear coöperating with a gear on said shaft, and a cam to rock said lever, substantially as described.

3. In an eyeleting-machine, the combination with a reciprocating punch, of a laterally-movable guide-frame for said punch, a lever connected with said guide-frame, an actuating-lever connected with the lever aforesaid, the axes of said levers being at an angle to each other, a cam for oscillating said actuating-lever, and a universal joint connecting the said levers, substantially as and for the purpose described.

4. In an eyeleting-machine, the combination with an eyelet-feed hopper provided with lateral openings, of an agitating device comprising a plate extending partially over the floor of the hopper, an oscillating support for said plate, and flexible projections, as bristles, projecting from said support toward the openings, said bristles being adjacent to the floor of the hopper in substantially the same plane as that occupied by the plate, substantially as and for the purpose described.

5. In an eyeleting-machine, the combination with a punch provided with an annular clenching-surface, of a reciprocating setting device to coöperate with said clenching-surface, a finger projecting from the clenching-surface of said setting device to pick up and support an eyelet in position thereon, and means for withdrawing said finger before the said punch and setting device come together to prevent the engagement of said finger with the cutting portion of the punch.

6. In an eyeleting-machine, the combination with the punch, of an oscillating shaft arranged to produce a reciprocating vertical movement of said punch, a swinging lever having a gear connection with said shaft, a laterally-movable guide-frame for said punch, a lever connected with said guide-frame to produce a lateral movement thereof, a main operating-shaft, and cams on said main shaft coöperating respectively with the levers aforesaid, substantially as described.

7. In an eyeleting-machine, the combination with the punch provided with an annular clenching-surface, of an oscillating shaft arranged to produce a reciprocating vertical movement of said punch, a swinging lever having a gear connection with said shaft, a laterally-movable guide-frame for said punch, a lever connected with said guide-frame to produce the lateral movement thereof, a main operating-shaft, cams on said main shaft coöperating respectively with the levers aforesaid, and a reciprocating lower set to coöperate with said annular clenching-surface and having a crank connection with said main shaft, substantially as described.

8. In an eyeleting-machine, the combination with the punch provided with an annular clenching-surface, of an oscillating shaft arranged to produce a reciprocating vertical movement of said punch, a swinging lever having a gear connection with said shaft, a laterally-movable guide-frame for said punch, a lever connected with said guide-frame to produce the lateral movement thereof, a main operating-shaft, cams on said main shaft coöperating respectively with the levers aforesaid, a reciprocating lower set to coöperate with said annular clenching-surface and having a crank connection with said main shaft, an eyelet-feed chute movable into and out of the path of said lower set, and a cam on the main shaft to produce such movement of said chute, substantially as described.

9. In an eyeleting-machine, the combination with the punch provided with an annular clenching-surface, of an oscillating shaft arranged to produce a reciprocating vertical movement of said punch, a swinging lever having a gear connection with said shaft, a laterally-movable guide-frame for said punch, a lever connected with said guide-frame to produce the lateral movement thereof, a main operating-shaft, cams on said main shaft coöperating respectively with the levers aforesaid, a reciprocating lower set to coöperate with said annular clenching-surface and having a crank connection with said main shaft, an eyelet-feed chute movable into and out of the path of said lower set, a cam on the main shaft to produce such movement of said chute, and a frame or inclosing shell containing bearings for said shafts and levers and substantially inclosing the same.

In testimony whereof I have signed my name to this specification in the presence of two subscribing witnesses.

PERLEY R. GLASS.

Witnesses:
HENRY J. LIVERMORE,
NANCY P. FORD.

connected by means of a link $i^{14}$ with a portion of the chute-carrier $o$. The means for supporting and operating said chute-carrier, which have been hereinbefore described, are such that the said chute-carrier has a relatively slight motion, causing the machine to run with less jar and vibration than the machines as heretofore commonly constructed. For this reason the means above described for operating the agitating devices are such as to multiply the movement thereof, the lever $i^{10}$ being much longer than the lever $i^{13}$, so that a relatively small movement of the latter produces a much greater movement of the former.

It is desirable in machines of this class to afford means for setting the eyelets at various distances apart, and to accomplish this in the machine which forms the subject of the present invention it is obviously necessary only to vary the range of lateral movement of the punch. In other words, it is necessary only that the punch should travel a distance equal to the space desired between the eyelets, so that in its lateral movement it will move the material the necessary distance. As has already been stated, the lateral or feed movement of the punch is directly produced by the swinging movement of the lever $g$, one end of which is connected to the traveling frame $f$ and the other to the lever $h$, which travels the same distance at each rotation of the main shaft. If, therefore, the pivotal support of the said lever $g$ is moved toward or from the point of connection between the said lever $g$ and the lever $h$, the extent of movement of the frame $f$, which is connected to the opposite end of the lever $g$, will be correspondingly varied. To produce this result, the block $g^3$, in which the lever $g$ has its pivotal support, is arranged to be moved, and is shown as mounted in a guide $g^4$, consisting of a lug or projection $g^5$ from the inner surface of the frame A, to which is secured a support or bracket $g^6$, as by screws $g^{60}$. The block is provided with lateral flanges, one of which rests on the surface of the lug and the other on that of the bracket, while the body of the block fits between said parts, which thus constitute a supporting-guideway along which said block travels. (See Fig. 4.) The said block is connected by means of a lug $g^7$ with a link $g^8$, which in turn is connected to the crank $g^9$ on a rock-shaft or spindle $g^{10}$, having a suitable bearing in the frame. The said rock-shaft or spindle $g^{10}$ is provided with an arm $g^{12}$, having a handle $g^{13}$, (see Fig. 5,) the said arm being arranged to be locked in any desired position after the block $g^3$ has been shifted to determine the extent of the feed movement of the punch. As herein shown, the said arm is provided with a slot $g^{14}$, through which extends a locking-screw $g^{15}$, provided with operating members $g^{16}$, whereby it can be loosened or tightened, the said locking-screw $g^{15}$ being provided with a shoulder which bears upon the arm $g^{12}$ along the slot $g^{14}$, so that it will securely hold the said arm in any desired position. The pivotal bearing member for the lever $g$ is shown as a sleeve $g^{30}$, having projections $g^{31}$, bearing, respectively, in the block $g^3$ above described and in a sleeve $g^{32}$ upon the shaft $d$, the purpose of said sleeve being to afford a firmer bearing for the member $g^{30}$. It will be seen, therefore, that when the block $g^3$ is shifted, as above described, the bearing member $g^{30}$ is free to move along the lever $g$, the pivotal support or fulcrum thereof thus being moved toward or from the actuating-lever $h$, and thereby varying the extent of lateral movement of the punch, Fig. 3. To hold the lever $g$ and its bearing-block in position and prevent rattling, &c., the bearing projection from the sleeve $g^{32}$, which receives the upper projection $g^{31}$, is screw-threaded to receive nuts or threaded collars $g^{33}$, which bear against the block $g^{30}$ to keep said block the proper distance from said sleeve. In order that the punch may always be arrested in the same place at the end of the feed movement, so as to be in alinement with the setting device regardless of the extent of such feed movement, the pivotal bearing member for the lever is arranged to be moved along a line extending from the end of the operating-arm $h^6$ (when the said arm is in the position assumed thereby at the end of the forward feed movement) toward the said setting device, so that the punch at the end of the feed movement will always stop in line with the said setting device regardless of the position of the movable pivotal support.

As herein shown, the frame of the machine is made in the form of a hollow inclosing shell, so that nearly all the operative parts are inclosed and protected. The bearings for the main shaft B and the counter-shaft $d$ are formed in the walls of the shell, while the operating-levers are provided with cone-bearings, as described, inside of the shell. In order that said bearings may be easily gotten at for adjustment, the frame or shell is provided with openings $A^5$, there being also openings in the levers $d^6$ and $h$ to render the inner cones, upon which the said levers bear, accessible.

While the machine as hereinbefore described is a simple and thoroughly practicable embodiment of the invention, it is not intended to limit the invention to the specific construction shown and described, since modifications may obviously be made without departing from the invention.

I claim—

1. In an eyeleting-machine, the combination with a punch, of an eccentric mounted on a shaft and adapted to coöperate with said punch to produce a longitudinal movement thereof, means for oscillating the said shaft which is so arranged that the oscillation thereof in one direction produces a complete movement of the said punch in its direction to operate and a slight movement thereof in